US 6,565,360 B1

(12) United States Patent
Kavvouras

(10) Patent No.: US 6,565,360 B1
(45) Date of Patent: May 20, 2003

(54) ORRERY

(76) Inventor: George Kavvouras, 384 River Rd, Carlisle, MA (US) 01741

( * ) Notice: Subject to any disclaimer, the term of this patent is extended or adjusted under 35 U.S.C. 154(b) by 0 days.

(21) Appl. No.: 09/865,351

(22) Filed: May 25, 2001

(51) Int. Cl.[7] ............................................. G09B 27/00
(52) U.S. Cl. ..................... 434/284; 434/290; 434/291
(58) Field of Search ........................ 434/276, 284, 434/285, 287, 288, 290, 291, 292, 293, 294

(56) References Cited

U.S. PATENT DOCUMENTS

| | | | | |
|---|---|---|---|---|
| 25,476 A | * | 9/1859 | Allen | 434/291 |
| 575,735 A | * | 1/1897 | Reese | 40/495 |
| 1,770,820 A | | 7/1930 | Tomasevich | |
| 2,074,363 A | * | 3/1937 | Burke | 124/1 |
| 3,029,528 A | * | 4/1962 | Verson | 434/291 |
| 3,287,832 A | | 11/1966 | Baerg | |
| 3,617,063 A | * | 11/1971 | Dyer et al. | 273/239 |
| 3,733,720 A | | 5/1973 | Byers | |
| 4,392,831 A | | 7/1983 | Schubert | |
| 4,400,162 A | | 8/1983 | Rustemis | |
| D356,115 S | | 3/1995 | Dayhoff | |

* cited by examiner

Primary Examiner—Derris H. Banks
Assistant Examiner—Kurt Fernstrom

(57) ABSTRACT

An orrery for teaching a user about the solar system. The orrery includes a generally hollow sphere and has an outer surface and an inner surface. The sphere is generally transparent. Each of plurality of rings has consecutively descending smaller diameter from a largest ring to a smallest ring. A plurality of pair of couplers couple the rings to each other and couple the largest ring to the inner surface of the sphere such that the rings are positioned within each other in order of descending lengths of diameters and are concentric. Each of a plurality of globes represents a planet of the solar system and each is attached to one of the rings such that the globes are extendable along the rings. An orb, being generally coaxial with the smallest ring, is attached to the smallest ring by a plurality of fasteners. The orb represents the sun.

10 Claims, 4 Drawing Sheets

ORRERY

BACKGROUND OF THE INVENTION

1. Field of the Invention

The present invention relates to orrery and planetarium devices and more particularly pertains to a new orrery for teaching a user about the solar system.

2. Description of the Prior Art

The use of orrery and planetarium devices is known in the prior art. More specifically, orrery and planetarium devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,400,162; U.S. Pat. No. 4,392,831; U.S. Pat. No. 3,287,832; U.S. Pat. No. 1,770,820; U.S. Des. Pat. No. 356,115; and U.S. Pat. No. 3,733,720.

While these devices fulfill their respective, particular objectives and requirements, the aforementioned patents do not disclose a new orrery. The inventive device includes a generally hollow sphere and has an outer surface and an inner surface. The sphere is generally transparent. Each of plurality of rings has consecutively descending smaller diameter from a largest ring to a smallest ring. The largest ring has a diameter smaller than a diameter of the sphere. A plurality of pair of couplers couple the rings to each other and couple the largest ring to the inner surface of the sphere such that the rings are positioned within each other in order of descending lengths of diameters and are concentric. Each of the rings is coaxial with respect to the sphere. Each of a plurality of globes represents a planet of the solar system. A plurality of securing members secure each of the globes to one of the rings such that the globes are extendable along the rings. An orb, being generally coaxial with the smallest ring, is attached to the smallest ring by a plurality of fasteners. The orb represents the sun.

In these respects, the orrery according to the present invention substantially departs from the conventional concepts and designs of the prior art, and in so doing provides an apparatus primarily developed for the purpose of teaching a user about the solar system.

SUMMARY OF THE INVENTION

In view of the foregoing disadvantages inherent in the known types of orrery and planetarium devices now present in the prior art, the present invention provides a new orrery construction wherein the same can be utilized for teaching a user about the solar system.

The general purpose of the present invention, which will be described subsequently in greater detail, is to provide a new orrery apparatus and method which has many of the advantages of the orrery and planetarium devices mentioned heretofore and many novel features that result in a new orrery which is not anticipated, rendered obvious, suggested, or even implied by any of the prior art orrery and planetarium devices, either alone or in any combination thereof.

To attain this, the present invention generally comprises a generally hollow sphere and has an outer surface and an inner surface. The sphere is generally transparent. Each of plurality of rings has consecutively descending smaller diameter from a largest ring to a smallest ring. The largest ring has a diameter smaller than a diameter of the sphere. A plurality of pair of couplers couple the rings to each other and couple the largest ring to the inner surface of the sphere such that the rings are positioned within each other in order of descending lengths of diameters and are concentric. Each of the rings is coaxial with respect to the sphere. Each of a plurality of globes represents a planet of the solar system. A plurality of securing members secure each of the globes to one of the rings such that the globes are extendable along the rings. An orb, being generally coaxial with the smallest ring, is attached to the smallest ring by a plurality of fasteners. The orb represents the sun.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new orrery apparatus and method which has many of the advantages of the orrery and planetarium devices mentioned heretofore and many novel features that result in a new orrery which is not anticipated, rendered obvious, suggested, or even implied by any of the prior art orrery and planetarium devices, either alone or in any combination thereof.

It is another object of the present invention to provide a new orrery which may be easily and efficiently manufactured and marketed.

It is a further object of the present invention to provide a new orrery which is of a durable and reliable construction.

An even further object of the present invention is to provide a new orrery which is susceptible of a low cost of manufacture with regard to both materials and labor, and which accordingly is then susceptible of low prices of sale to the consuming public, thereby making such orrery economically available to the buying public.

Still yet another object of the present invention is to provide a new orrery which provides in the apparatuses and methods of the prior art some of the advantages thereof, while simultaneously overcoming some of the disadvantages normally associated therewith.

Still another object of the present invention is to provide a new orrery for teaching a user about the solar system.

Yet another object of the present invention is to provide a new orrery which includes a generally hollow sphere and has an outer surface and an inner surface. The sphere is generally transparent. Each of plurality of rings has consecutively descending smaller diameter from a largest ring to a smallest ring. The largest ring has a diameter smaller than a diameter of the sphere. A plurality of pair of couplers couple the rings to each other and couple the largest ring to the inner surface of the sphere such that the rings are positioned within each other in order of descending lengths of diameters and are concentric. Each of the rings is coaxial with respect to the sphere. Each of a plurality of globes represents a planet of the solar system. A plurality of securing members secure each of the globes to one of the rings such that the globes are extendable along the rings. An orb, being generally coaxial with the smallest ring, is attached to the smallest ring by a plurality of fasteners. The orb represents the sun.

Still yet another object of the present invention is to provide a new orrery that has planets which move along rings simulating orbits.

Even still another object of the present invention is to provide a new orrery that has orbits which are rotational with respect to each other.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
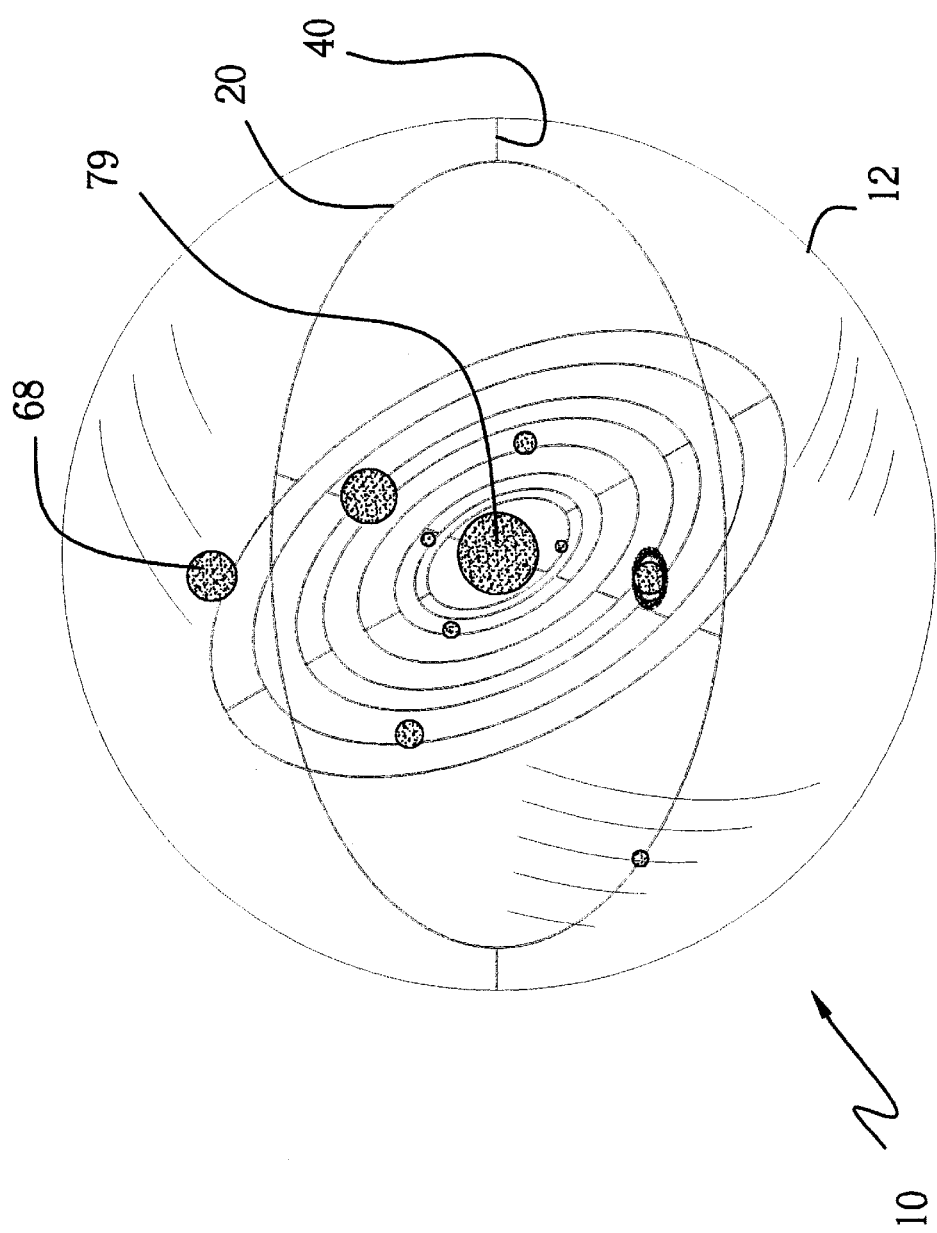
FIG. 1 is a schematic side view of a new orrery according to the present invention.
Figure 2:
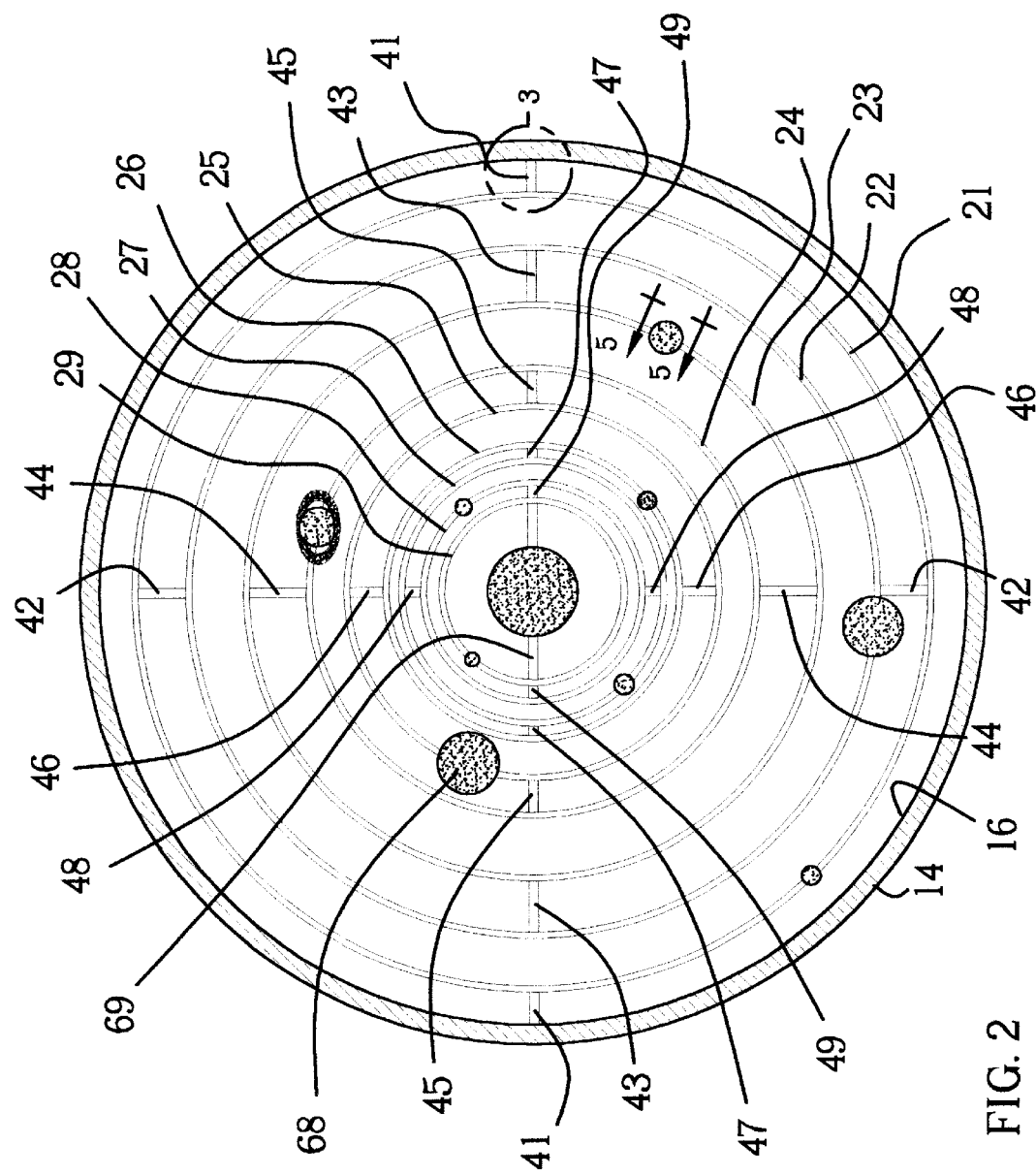
FIG. 2 is a schematic cross-sectional view of the present invention.
Figure 4:
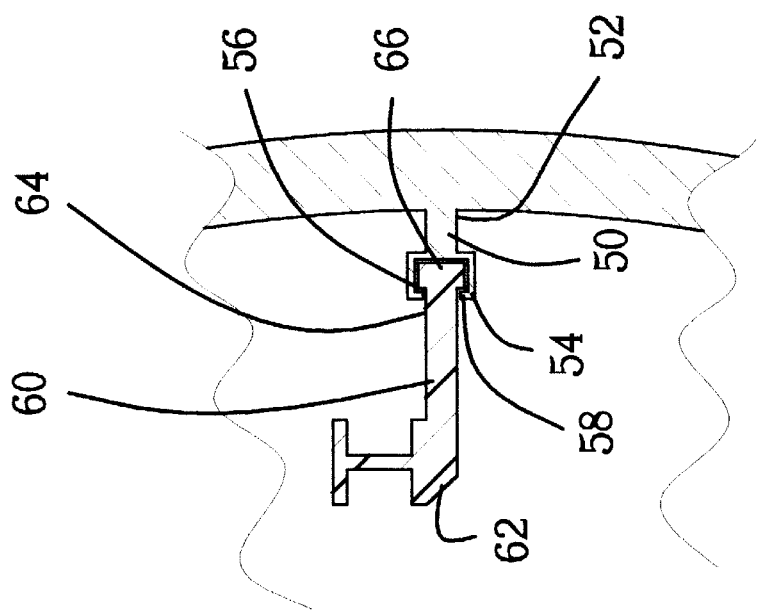
FIG. 4 is a schematic cross-sectional view taken along line 4—4 of FIG. 3 of the present invention.
Figure 3:
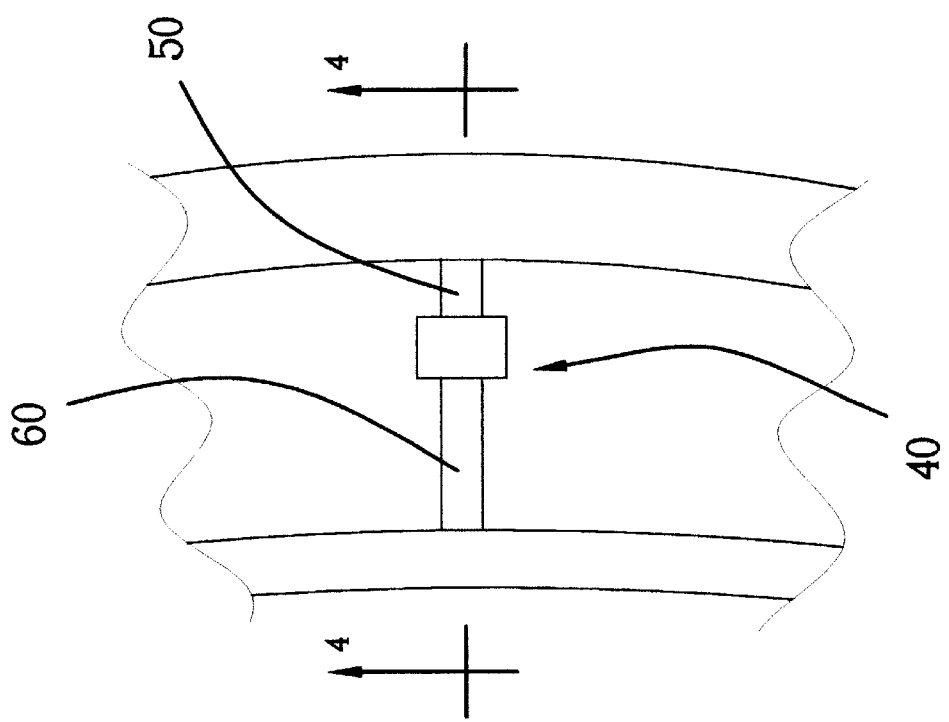
FIG. 3 is a schematic exploded view of a coupler of the present invention.
Figure 6:
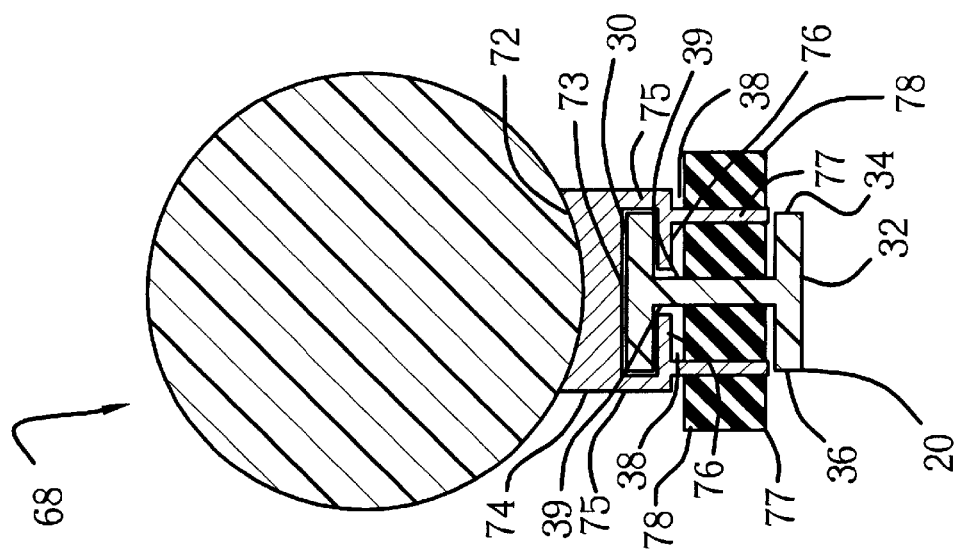
FIG. 6 is a schematic cross-sectional view taken along line 5—5 of the present invention.
Figure 5:
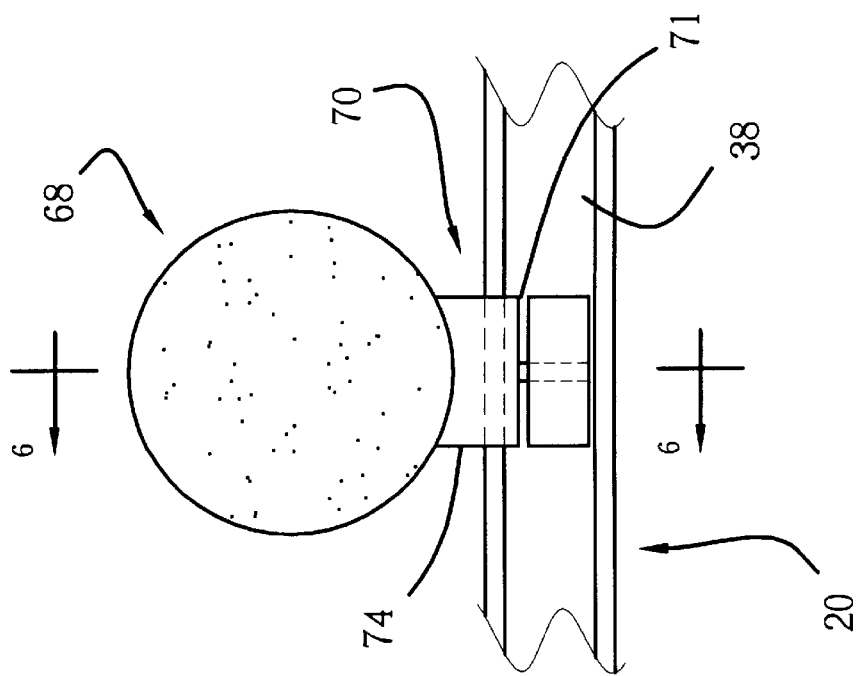
FIG. 5 is a schematic side view of a ring of the present invention.

With reference now to the drawings, and in particular to FIGS. 1 through 6 thereof, a new orrery embodying the principles and concepts of the present invention and generally designated by the reference numeral 10 will be described.

As best illustrated in FIGS. 1 through 6, the orrery 10 includes a generally hollow sphere 12 having an outer surface 14 and an inner surface 16. The sphere 12 is generally transparent and comprises a plastic material.

Each of a plurality of rings 20 has consecutively descending smaller diameters from a largest ring 21 to a smallest ring 29. The largest ring 21 has a diameter smaller than a diameter of the sphere 12. The largest ring 21 is a first ring and the smallest ring 29 is a ninth ring such that there is a second 22, third 23, fourth 24, fifth 25, sixth 26, seventh 27 and eighth 28 ring. Each of the rings 20 has a top surface 30, a bottom surface 32, a first lateral side 34 and a second lateral side 36. Each of the first 34 and second 36 lateral sides has a channel 38 therein extending around the rings 20.

A plurality of pair of couplers 40 couple the rings 20 to each other and couple the largest ring 21 to the inner surface 16 of the sphere 12 such that the rings 20 are positioned within each other in order of descending lengths of diameters and are concentric. Each of the rings 20 is coaxial with respect to the sphere 12. A first pair of couplers 41 couples the first ring 21 to the sphere 12. Each of a second 42, third 43, fourth 44, fifth 45, sixth 46, seventh 47, eighth 48, and ninth 49 pair of couplers 40 couples an associated numbered ring 20 with the next adjacent and larger ring 20. For example, the second coupler couples the second ring 22 to the first ring 21. Each of the couplers 40 of a pair of couplers is diametrically opposite of each other. Each of the odd numbered pairs of couplers 40 is positioned along a first plane bisecting the sphere. Each of the even numbered pairs of couplers 40 is positioned along second plane bisecting the sphere. The first plane is orientated perpendicular to the second plane.

Each of the couplers 40 includes a first rod 50 and a second rod 60. The first rod 50 has a first end 52 and a second end 54. The first end 52 is attached to a respective one of the rings 20 or the sphere 12. The first rod 50 extends toward an axis of the sphere 12. The second end 54 of the first rod 50 has a bore 56 extending therein. An outer edge of the bore 56 has a lip 58 thereon extending inward such that the bore 56 defines a female coupling. The bore 56 has a cylindrical shape. The second rod 60 has a first end 62 and a second end 64. The first end 62 is coupled to a respective one of the rings 20 and attached to the bottom surface 32 of the ring 20. The second rod 60 extends outwardly away from an axis of the sphere 12. The second end 64 has a bulbous member 66 thereon. The bulbous member 66 is positioned in the bore 56 such that the lip 58 holds the bulbous member 66 within the bore 56. The second rod 60 is rotational with respect to the first rod 50. This allows the rings 20 to pivot with respect to each other.

Each of a plurality of the globes 68 represents a planet of the solar system. There are a number of globes 68 equal to the number of rings 20. The globes 68 having color indicia and annular members thereon as needed to represent Mercury, Venus, Earth, Mars, Saturn, Jupiter, Uranus, Neptune and Pluto.

Each of a plurality of securing members 70 secures each of the globes 68 to one of the rings 20 such that the globes 68 are extendable along the rings 20. Each of the securing members 70 is attached to one of the globes 68. Each of the securing means 70 includes a block 71 and a pair of wheels 78. The block 71 has a top side 72, a bottom side 73 and a peripheral edge 74 extending between the top 72 and bottom 73 sides. The top side 72 is concave and is attached to an outer surface of one of the globes 68. A pair of arms 75 are spaced from each other and extend downward from the bottom side 73. Each of a pair of flanges 76 is attached to one of the arms 75 and extends toward each other such that a slot is defined between the flanges 76. The top surface 30 of the ring 20 is abuttable against the bottom side 73 of the block 71 such that each of the flanges 76 extends into one of the channels 38. Each of a pair of axles 77 is attached to and extends downwardly away from one of the flanges 76 such that each of the axles 77 is positioned in one of the channels 38. Each of the wheels 78 is rotatably attached to one of the axles 77. Each of the wheels 78 abuts a bottom wall 39 of the respective channel 38.

An orb 79 is generally coaxial with the smallest ring 29. A plurality of fasteners 69 extends between and is attached to the orb 79 and the smallest ring 29. The orb 79 represents the sun, and is preferably colored yellow.

In use, the device 10 is used for teaching a person the relationship and order of the planets with respect to each other. The planets are movable along the rings to show their orbits.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An orrery device for depicting a representation of a solar system comprising a sun and nine planets, said device comprising:

a sphere being generally hollow and having an outer surface and an inner surface, said sphere comprising a material, said material of said sphere being generally transparent;

a plurality of rings, each of said rings having consecutively descending smaller diameters from a largest ring to a smallest ring, said largest ring having a diameter smaller than an inner diameter of said sphere;

a plurality of pairs of couplers for coupling said rings to each other and for coupling said largest ring to said inner surface of said sphere such that said rings are positioned within each other in order of descending lengths of diameters and are concentric, each of said rings being coaxial with respect to said sphere;

a plurality of globes, each of said globes representing a planet of the solar system;

a plurality of securing members for securing each of said globes to one of said rings, each of said securing members being attached to one of said globes such that said globes are positionable along said rings;

an orb being generally coaxial with said smallest ring, a plurality of fasteners extending between and being attached to said orb and said smallest ring, said orb representing the sun;

each of said rings has a top surface, a bottom surface, a first lateral side and a second lateral side, each of said first and second lateral sides each having a channel therein extending around said rings; and each of said securing members comprising;

a block having a top side, a bottom side and a peripheral edge extending between said top and bottom sides, said top side being concave and being attached to an outer surface of one of said globes, a pair of arms extending downward from said bottom side, one of said pair of arms being in a spaced relationship to the other one of said pair of arms, each of a pair of flanges being attached to one of said arms and extending toward each other such that a slot is defined between said flanges, wherein said top surface of said ring is abuttable against said bottom side of said block such that each of said flanges extends into one of said channels.

2. The orrery device as in claim 1, wherein said largest ring is a first ring and said smallest ring is a ninth ring such that there is a second, third, fourth, fifth, sixth, seventh and eighth ring.

3. The orrery device as in claim 1, wherein each of said securing members further comprises:

a pair of axles, each of said axles being attached to and extending downwardly away from one of said flanges such that each of said axles is positioned in one of said channels; and each of a pair of wheels being rotatably attached to one of said axles, each of said wheels abutting a bottom wall of the respective channel.

4. The orrery device as in claim 2, wherein a first pair of couplers couples said first ring to said sphere, each of a second, third, fourth, fifth, sixth, seventh, eighth, and ninth pair of couplers coupling an associated numbered ring with the next adjacent and larger ring, each of the couplers of a pair of couplers being diametrically opposite of each other, each of the odd numbered pairs of couplers being positioned along a first plane bisecting said sphere, each of the even numbered pairs of couplers being positioned along second plane bisecting said sphere, said first plane being orientated perpendicular to said second plane.

5. The orrery device as in claim 4, wherein each of couplers comprises:

a first rod having a first end and a second end, said first end being attached to a respective one of said rings or said sphere, said first rod extending toward an axis of said sphere; and a second rod having a first end and a second end, said first end being coupled to a respective one of said rings and attached to said bottom surface of said ring, said second rod extending outwardly away from an axis of said sphere, said second end of said second rod being rotatably coupled to said second end of said first rod.

6. The orrery device as in claim 1 wherein each of couplers comprises:

a first rod having a first end and a second end, said first end being attached to a respective one of said rings or said sphere, said first rod extending toward an axis of said sphere; and a second rod having a first end and a second end, said first end being coupled to a respective one of said rings and attached to said bottom surface of said ring, said second rod extending outwardly away from an axis of said sphere, said second end of said second rod being rotatably coupled to said second end of said first rod.

7. An orrery device for depicting a representation of a solar system comprising a sun and nine planets, said device comprising:

a sphere being generally hollow and having an outer surface and an inner surface, said sphere being generally transparent, said sphere comprising a plastic material;

a plurality of rings, each of said rings having consecutively descending smaller diameters from a largest ring to a smallest ring, said largest ring having a diameter smaller than an inner diameter of said sphere, said largest ring being a first ring and said smallest ring being a ninth ring such that there is a second, third, fourth, fifth, sixth, seventh and eighth ring, each of said rings having a top surface, a bottom surface, a first lateral side and a second lateral side, each of said first and second lateral sides each having a channel therein extending around said rings;

a plurality of pairs of couplers for coupling said rings to each other and for coupling said largest ring to said inner surface of said sphere such that said rings are positioned within each other in order of descending lengths of diameters and are concentric, each of said rings being coaxial with respect to said sphere, a first pair of couplers coupling said first ring to said sphere, each of a second, third, fourth, fifth, sixth, seventh, eighth, and ninth pair of couplers coupling an associated numbered ring with the next adjacent and larger ring, each of the couplers of a pair of couplers being diametrically opposite of each other, each of the odd numbered pairs of couplers being positioned along a first plane bisecting said sphere, each of the even numbered pairs of couplers being positioned along second plane bisecting said sphere, said first plane being orientated perpendicular to said second plane, each of said couplers comprising;

a first rod having a first end and a second end, said first end being attached to a respective one of said rings or said sphere, said first rod extending toward an axis of said sphere, said second end of said first rod having a bore extending therein, an outer edge of said bore having a lip thereon extending inward such that said bore defines a female coupling, said bore having a cylindrical shape;

a second rod having a first end and a second end, said first end being coupled to a respective one of said rings and attached to said bottom surface of said ring, said second rod extending outwardly away from an axis of said sphere, said second end having a bulbous member thereon, said bulbous member being positioned in said bore such that said lip holds said bulbous member within said bore, said second rod being rotational with respect to said first rod;

a plurality of globes, each of said globes representing a planet of the solar system, wherein there are a number of globes equal to the number of rings;

a plurality of securing members for securing each of said globes to one of said rings , each of said securing members being attached to one of said globes such that said globes are positionable along said rings, each of said securing members comprising;

a block having a top side, a bottom side and a peripheral edge extending between said top and bottom sides, said top side being concave and being attached to an outer surface of one of said globes, a pair of arms being spaced from each other and extending downward from said bottom side, each of a pair of flanges being attached to one of said arms and extending toward each other such that a slot is defined between said flanges, wherein said top surface of said ring is abuttable against said bottom side of said block such that each of said flanges extends into one of said channels;

a pair of axles, each of said axles being attached to and extending downwardly away from one of said flanges such that each of said axles is positioned in one of said channels; each of a pair of wheels being rotatably attached to one of said axles, each of said wheels abutting a bottom wall of the respective channel; and an orb being generally coaxial with said smallest ring, a plurality of fasteners extending between and being attached to said orb and said smallest ring, said orb representing the sun.

8. An orrery device for depicting a representation of a solar system comprising a sun and nine planets, said device comprising:

a sphere being generally hollow and having an outer surface and an inner surface, said sphere comprising a material, said material of said sphere being generally transparent;

a plurality of rings, each of said rings having consecutively descending smaller diameters from a largest ring to a smallest ring, said largest ring having a diameter smaller than an inner diameter of said sphere;

a plurality of pairs of couplers for coupling said rings to each other and for coupling said largest ring to said inner surface of said sphere such that said rings are positioned within each other in order of descending lengths of diameters and are concentric, each of said rings being coaxial with respect to said sphere;

a plurality of globes, each of said globes representing a planet of the solar system;

a plurality of securing members for securing each of said globes to one of said rings, each of said securing members being attached to one of said globes such that said globes are positionable along said rings;

an orb being generally coaxial with said smallest ring, a plurality of fasteners extending between and being attached to said orb and said smallest ring, said orb representing the sun;

said largest ring being a first ring and said smallest ring is a ninth ring such that there is a second, third, fourth, fifth, sixth, seventh and eighth ring;

a first pair of couplers coupling said first ring to said sphere, each of a second, third, fourth, fifth, sixth, seventh, eighth, and ninth pair of couplers coupling an associated numbered ring with the next adjacent and larger ring, each of the couplers of a pair of couplers being diametrically opposite of each other, each of the odd numbered pairs of couplers being positioned along a first plane bisecting said sphere, each of the even numbered pairs of couplers being positioned along second plane bisecting said sphere, said first plane being orientated perpendicular to said second plane.

9. The orrery device as in claim 8, wherein each of couplers comprises:

a first rod having a first end and a second end, said first end being attached to a respective one of said rings or said sphere, said first rod extending toward an axis of said sphere; and a second rod having a first end and a second end, said first end being coupled to a respective one of said rings and attached to said bottom surface of said ring, said second rod extending outwardly away from an axis of said sphere, said second end of said second rod being rotatably coupled to said second end of said first rod.

10. The orrery device as in claim 8 wherein each of couplers comprises:

a first rod having a first end and a second end, said first end being attached to a respective one of said rings or said sphere, said first rod extending toward an axis of said sphere; and a second rod having a first end and a second end, said first end being coupled to a respective one of said rings and attached to said bottom surface of said ring, said second rod extending outwardly away from an axis of said sphere, said second end of said second rod being rotatably coupled to said second end of said first rod.

* * * * *